United States Patent
Chien et al.

(10) Patent No.: US 9,733,742 B2
(45) Date of Patent: Aug. 15, 2017

(54) TOUCH PANEL, TOUCH DISPLAY PANEL AND TOUCH DISPLAY DEVICE

(71) Applicant: Innolux Corporation, Chu-Nan, Miao-Li County (TW)

(72) Inventors: Chuan-Chi Chien, Miao-Li County (TW); Ya-Ling Chen, Miao-Li County (TW)

(73) Assignee: INNOLUX CORPORATION, Chu-Nan, Miao-Li County (TW)

(*) Notice: Subject to any disclaimer, the term of this patent is extended or adjusted under 35 U.S.C. 154(b) by 57 days.

(21) Appl. No.: 14/855,368

(22) Filed: Sep. 15, 2015

(65) Prior Publication Data
US 2016/0077645 A1 Mar. 17, 2016

(30) Foreign Application Priority Data
Sep. 16, 2014 (TW) .............................. 103131873 A

(51) Int. Cl.
| | |
|---|---|
| *G02F 1/1333* | (2006.01) |
| *G06F 3/041* | (2006.01) |
| *G06F 3/044* | (2006.01) |
| *G09G 3/30* | (2006.01) |
| *G09G 3/36* | (2006.01) |

(52) U.S. Cl.
CPC ............ *G06F 3/0412* (2013.01); *G06F 3/044* (2013.01); *G06F 2203/04111* (2013.01)

(58) Field of Classification Search
None
See application file for complete search history.

(56) References Cited

U.S. PATENT DOCUMENTS

| | | | | |
|---|---|---|---|---|
| 2001/0048275 | A1* | 12/2001 | Nakada | H01J 11/12 315/160 |
| 2013/0063371 | A1* | 3/2013 | Lee | G06F 3/044 345/173 |
| 2014/0049485 | A1 | 2/2014 | Oh et al. | |
| 2014/0218641 | A1* | 8/2014 | Chen | G06F 3/041 349/12 |
| 2014/0253825 | A1* | 9/2014 | He | G06F 3/044 349/12 |
| 2014/0293151 | A1* | 10/2014 | He | G06F 3/044 349/12 |

FOREIGN PATENT DOCUMENTS

TW  M437991 U1  9/2012

OTHER PUBLICATIONS

Taiwanese Office Action dated Dec. 15, 2015.

* cited by examiner

*Primary Examiner* — Ryan Crockett
(74) *Attorney, Agent, or Firm* — Rabin & Berdo, P.C.

(57) ABSTRACT

A touch panel, a touch display panel and a touch display device are provided. The touch panel includes a first substrate, a black matrix, and a transparent electrode layer. The first substrate has a display area and a mask area surrounding the display area. The black matrix is disposed on the mask area of the first substrate. The transparent electrode layer is disposed on the first substrate. The transparent electrode layer includes a first appearance electrode pattern disposed on the black matrix, and the first appearance electrode pattern includes two first edges and a first arc connected with the two first edges.

18 Claims, 8 Drawing Sheets

TOUCH PANEL, TOUCH DISPLAY PANEL AND TOUCH DISPLAY DEVICE

This application claims the benefit of Taiwan application Serial No. 103131873, filed Sep. 16, 2014, the subject matter of which is incorporated herein by reference.

BACKGROUND OF THE INVENTION

Field of the Invention

The invention relates in general to a touch panel, a touch display panel and a touch display device, and more particularly to a touch panel, a touch display panel and a touch display device whose electrode pattern has an arc.

Description of the Related Art

Referring to FIG. 1, a schematic diagram of forming a black matrix (BM) on a substrate of a touch panel is shown. In order to better describe the relationship between the substrate 10 and the black matrix 11, the substrate 10 does not completely overlap the black matrix 11 in FIG. 1.

During the manufacturing process of the touch sensor, the black matrix 11 with an opening is formed on the substrate 10. The opening of the black matrix 11 is formed at a display area 10b of the substrate 10, and the black matrix is formed on a mask area 10a of the substrate 10. As indicated in FIG. 1, the black matrix 11, used for masking the light source, includes an external edge Eext and an inner edge Ein, wherein the inner edge Ein represents the periphery of the display area 10b.

Referring to FIG. 2, a schematic diagram of a transparent electrode layer is shown. The transparent electrode layer 13 includes plural electrode patterns (ITO sensor patterns) arranged in M rows and N columns. The electrode patterns at the same row and adjacent to each other jointly form horizontal electrodes 131. The electrode patterns at the same column and adjacent to each other jointly form vertical electrodes 132. The horizontal electrodes 131 and the vertical electrodes 132 are interlaced to form an array of electrode patterns.

The transparent electrode layer 13 is formed on the substrate 10 and the black matrix 11. The part of the electrode patterns adjacent to the external edge of the transparent electrode layer 13 is formed on the mask area of the substrate 10 and the black matrix 11. On the other hand, the part of electrode patterns at the center of the transparent electrode layer 13 is formed at the opening of the black matrix 11 (that is, at the display area of the substrate 10).

After formation of the black matrix 11, the manufacturing process of touch display panel further includes the manufacturing processes of a display layer, a conductive layer, an insulating layer and so forth. These subsequent manufacturing processes require the condition of high temperature (such as 300° C.). Since the black matrix 11 cannot resist high temperature, the high temperature in subsequent manufacturing processes will make the black matrix 11 carbonized. The carbonized black matrix 11 has lower resistance, and may even have slight conductivity.

Meanwhile, the sharper and tinier the electrode patterns (ITO Sensor pattern) are formed on the black matrix 11, the higher the density of electric charges and the intensity of electric fields will be. When the electric charges on the electrode patterns of the transparent electrode layer 13 accumulate to a certain degree and generate significant voltage difference between the transparent electrodes, the phenomenon of point discharge will occur to the electrode patterns. When the phenomenon of point discharge occurs, the black matrix 11 with slight conductivity will be hit by electrostatic discharge (ESD), which may cause light leakage inside the panel or make the transparent electrodes short-circuited.

SUMMARY OF THE INVENTION

According to a first aspect of the disclosure, a touch panel including a first substrate, a black matrix and a transparent electrode layer is provided. The touch panel includes a first substrate having a display area and a mask area surrounding the display area. The black matrix is disposed on the mask area of the first substrate. The transparent electrode layer is disposed on the first substrate. The transparent electrode layer includes a first appearance electrode pattern disposed on the black matrix, wherein the first appearance electrode pattern includes two first edges and a first arc connected with the two first edges.

According to a second aspect of the disclosure, a touch display panel including a display panel, a first substrate, a black matrix and a transparent electrode layer is provided. The first substrate is disposed on the display panel and the first substrate has a display area and a mask area surrounding the display area. The black matrix is disposed on the mask area of the first substrate. The transparent electrode layer is disposed on the first substrate. The transparent electrode layer includes a first appearance electrode pattern disposed on the black matrix and a second appearance electrode pattern disposed on the display area. The first appearance electrode pattern includes two first edges and a first arc connected with the two first edges; and the second appearance electrode pattern includes two second edges and a second arc connected with the two second edges. A radius of curvature of the first arc is greater than a radius of curvature of the second arc.

According to a third aspect of the disclosure, a touch display device including a backlight module, a display panel, a first substrate, a black matrix, and a transparent electrode layer is provided. The display panel is disposed at one side of the backlight module. The first substrate is disposed on the display panel. The first substrate has a display area and a mask area surrounding the display area. The black matrix is disposed on the mask area of the first substrate. The transparent electrode layer is disposed on the first substrate. The transparent electrode layer includes a first appearance electrode pattern disposed on the black matrix, and a second appearance electrode pattern disposed on the display area. The first appearance electrode pattern includes two first edges and a first arc connected with the two first edges, and the second appearance electrode pattern includes two second edges and a second arc connected with the two second edges. A radius of curvature of the first arc is greater than a radius of curvature of the second arc.

The above and other aspects of the disclosure will become better understood with regard to the following detailed description of the preferred but non-limiting embodiment(s). The following description is made with reference to the accompanying drawings.

DETAILED DESCRIPTION OF THE INVENTION

It is assumed that the shapes of the electrode patterns are polygons (such as rhombuses or isosceles triangles). To resolve the phenomenon of electrostatic discharge which occurs to the transparent electrodes due to the accumulation of electric charges, the disclosure provides a method for determining the shapes of electrode patterns according to physical location of the electrode patterns.

Figure 1:
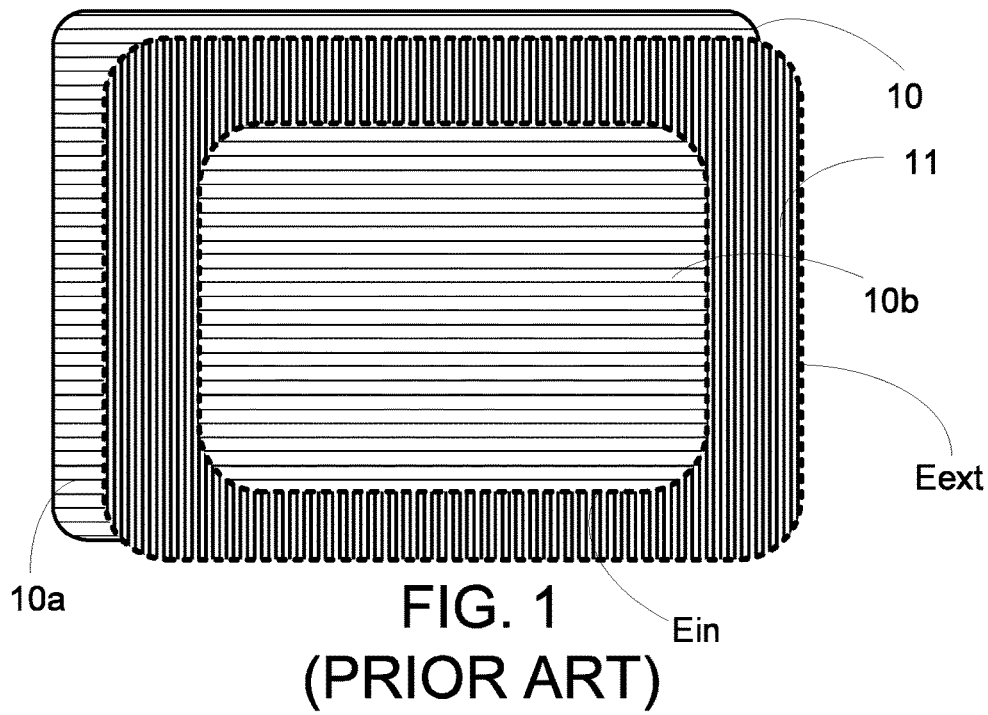
FIG. 1 (prior art) is a schematic diagram of forming a black matrix on a substrate of a touch sensor.
Figure 2:
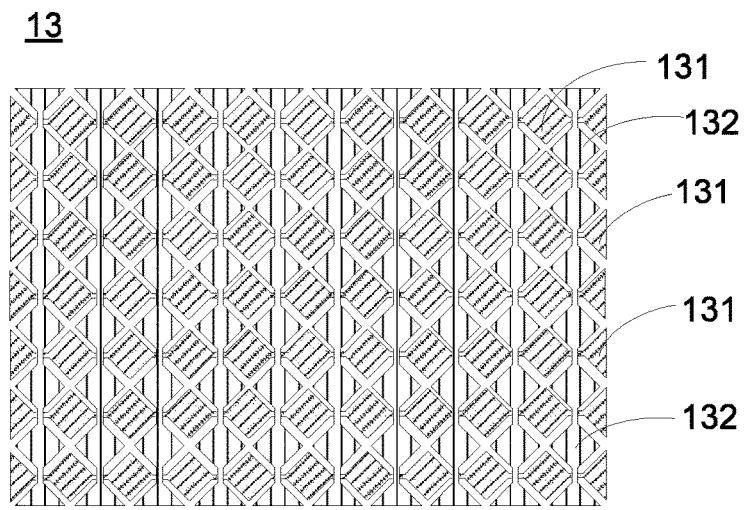
FIG. 2 (prior art) is a schematic diagram of a transparent electrode layer.
Figure 3:
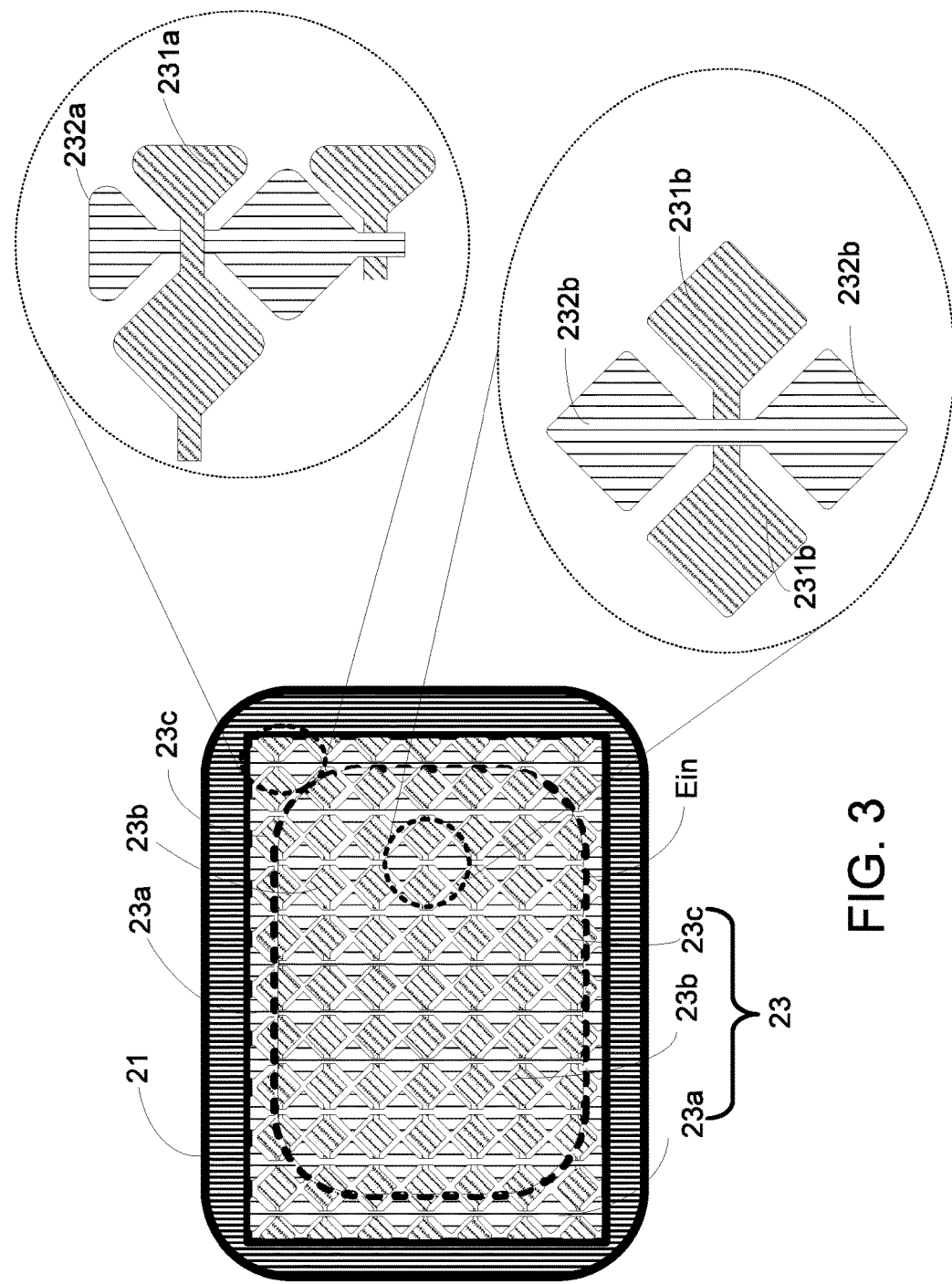
FIG. 3 is a schematic diagram of forming a transparent electrode layer on a black matrix according to the disclosure.

Referring to FIG. 3, a schematic diagram of forming a transparent electrode layer on a black matrix is shown. The transparent electrode layer 23 is disposed on the substrate and the black matrix 21, and the transparent electrode layer 23 includes plural electrode patterns.

The transparent electrode layer 23 includes M rows of horizontal electrodes and N columns of vertical electrodes. Each horizontal electrode includes N adjacent electrode patterns serially connected in a horizontal direction. Each vertical electrode includes M adjacent electrode patterns serially connected in a vertical direction. Regardless that an electrode is a horizontal electrode or a vertical electrode, different segments can be defined according to whether the electrode pattern is formed on the black matrix. That is, the electrode pattern formed on the black matrix 21 is defined as an endpoint segment of a vertical/horizontal electrode. The electrode pattern formed at the opening of the black matrix is defined as a middle segment of a vertical/horizontal electrode.

Based on the concepts of the disclosure, the shape of an electrode pattern is subjected to the physical position of the electrode pattern. The appearance of the electrode pattern is divided into three shapes.

For the electrode patterns located on the mask area and overlapping the black matrix 21, their shapes are polygons with fillets and such such electrode patterns are defined as first appearance electrode patterns 23a. 23a. Examples of the polygons are isosceles triangles with three fillets or rhombuses with four fillets. The top right corner of FIG. 3 shows an enlargement of several first appearance electrode patterns 23a. No matter the first appearance electrode pattern 23a is an endpoint segment 231a, 232a located at the horizontal electrodes or the vertical electrodes, two edges of the the first appearance electrode patterns 23a form a first type of fillet. The first type of fillet has two edges and an arc connected between the two edges, and a radius of curvature of the arc is in a range between 15-70 μm. When the radius of curvature of the arc is between 30-70 μm (such as 50 μm), the phenomenon of accumulation of electric charges can be dramatically mitigated.

For the electrode patterns located on the display area but not overlapping the black matrix 21, their shapes are polygons with second type of fillet and such electrode patterns are defined as second appearance electrode pattern 23b. The second type of fillet includes two edges and an arc connected between the two edges, and appearance of the second type of fillet is basically similar to a taper angle in a macroscopic view. In order to easily distinguish the first type of fillet and the second type of fillet, the second type of fillet is defined as taper angle for the sake of convenience. The radius of curvature of the arc of the second type of fillet is relatively small (for example, in a range between 5-35 μm), and the arc of the second type of fillet can barely be observed unless an optical microscope having a high magnification is used. The high magnification of optical microscope is, for example, 100× (with eyepiece 10× and the objective 10×) or higher.

Examples of the polygons of the electrode patterns located on the display area are rhombuses with four taper angles. The taper angle can be an acute angle, an obtuse angle or a right angle. The bottom-right corner of FIG. 3 shows an enlargement of several second appearance electrode patterns 23b. 23b. No matter the second appearance electrode pattern 23b is a middle segment 231b, 232b located on the horizontal electrodes or the vertical electrodes, two edges of the second appearance electrode pattern 23b form a taper angle.

The electrode patterns, divided by the inner edge Ein of the black matrix 11 such that part of the electrode patterns are formed on the display area (that is, an inner portion) and the other part of the electrode patterns are formed on the mask area (that is, an outer portion), are defined as a third appearance electrode pattern 23c. The third appearance electrode pattern 23 is basically a rhombus. Whether an angle of the rhombus is a taper angle or a fillet is subjected to the physical position of the angle. The third appearance electrode patterns 23c overlap the inner edge Ein of the black matrix 11 and cross over both the display area and the mask area. The third appearance electrode patterns 23c include two types of angles, a taper angle and a fillet. The angle of the outer portion of the third appearance electrode pattern 23c is defined as a fillet (that is, a third type of fillet whose arc has a greater radius of of curvature, for example, 15-70 μm). The angle of the inner portion of the third third appearance electrode pattern 23c is defined as a taper angle (that is, a fourth type of fillet whose arc has a smaller radius of curvature, for example, 5-35 μm). The arc of the fourth type of fillet can barely be observed unless an optical microscope having a high magnification is used. The high magnification magnification of optical microscope is, for example, 100× (with eyepiece 10× and the objective 10×) or higher. When the radius of curvature of the fillet is between 30-70 μm (such as 50 μm), the phenomenon of electric charges accumulating at the sharp end is greatly mitigated.

Based on the concepts of the disclosure, when an angle of an electrode pattern is formed on the mask area, two edges and an arc of electrode patterns jointly form a first/third type of fillet with greater radius of curvature. On the other hand, when an angle of an electrode pattern is formed on the display area, two edges and an arc of the electrode pattern jointly form a second/fourth type of fillet with smaller radius of curvature. Due to the consideration of maintaining the visual effect of the transparent electrode layer, the first type of fillet is merely used in the angles of the electrode patterns formed on the mask area.

Figure 4:
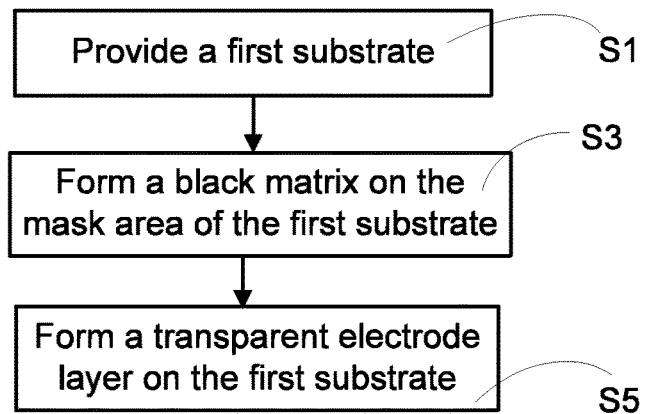
FIG. 4 is a flowchart of a method for manufacturing a touch panel according to the disclosure.

Referring to FIG. 4, a flowchart of a method for manufacturing a touch panel according to the disclosure is shown. Firstly, a first substrate (for example, a cover glass layer) is provided (step S1). The first substrate has a display area and a mask area surrounding the display area. Next, a black matrix is formed on the mask area of the first substrate (step S3). Then, a transparent electrode layer is formed on the first substrate (step S5). The transparent electrode layer is mainly formed on the display area for providing a touch control sensing function. Part of the transparent electrode layer extends to an upper side of the black matrix.

The transparent electrode layer includes plural electrode patterns. Details of forming different shapes of electrode patterns according to the positions of the electrode patterns can be referred to the descriptions of FIGS. 5A and 5B.

Figure 5A:
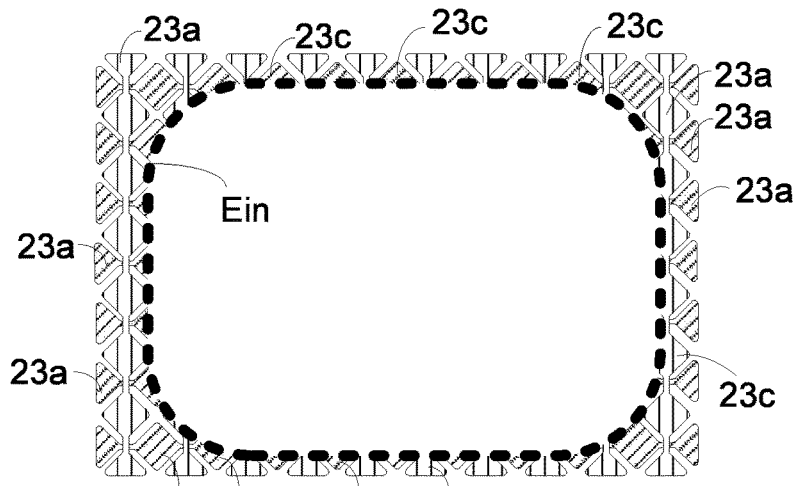
FIG. 5A is a schematic diagram of part of the transparent electrode layer located on the mask area.

Referring to FIG. 5A, a schematic diagram of a transparent electrode layer located on the mask area is shown. As indicated in the diagram, the shape of the first appearance electrode patterns 23a located on the mask area is basically a rhombus or a triangle, and a fillet is formed between two edges of the first appearance electrode patterns 23a. Besides, the third appearance electrode patterns 23c are partially located on the mask area and cross over the inner edge Ein of the black matrix. A fillet, located on the mask area, is formed between two edges of the part of the third appearance electrode patterns 23c.

Figure 5B:
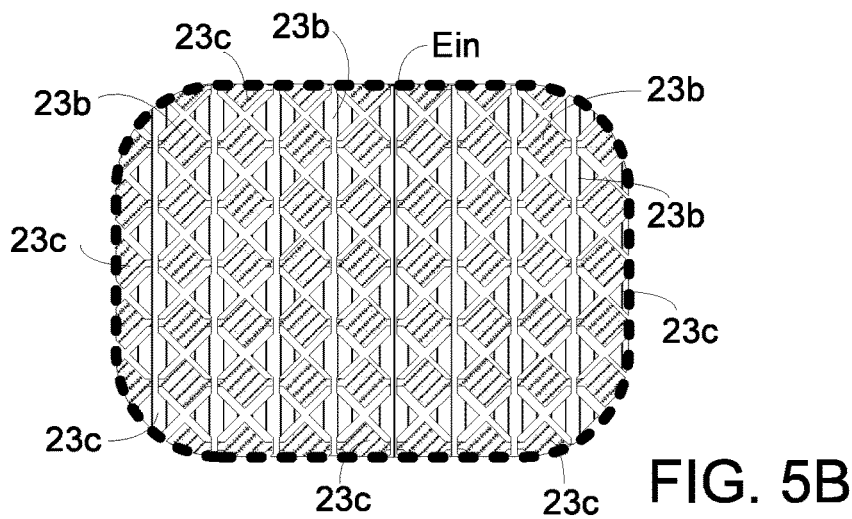
FIG. 5B is a schematic diagram of part of the transparent electrode layer located on the display area.

Referring to FIG. 5B, a schematic diagram of a transparent electrode layer formed on the display area is shown. As indicated in the diagram, the shape of the second appearance electrode patterns 23b formed on the display area is a rhombus, and a taper angle is formed between two edges of the second appearance electrode patterns 23b. Besides, the third appearance electrode patterns 23c are partially located on the display area and crosses over the inner edge Ein of the black matrix. A taper angle, located on the display area, is formed between two edges of the part of third appearance electrode patterns 23c.

Figure 6:
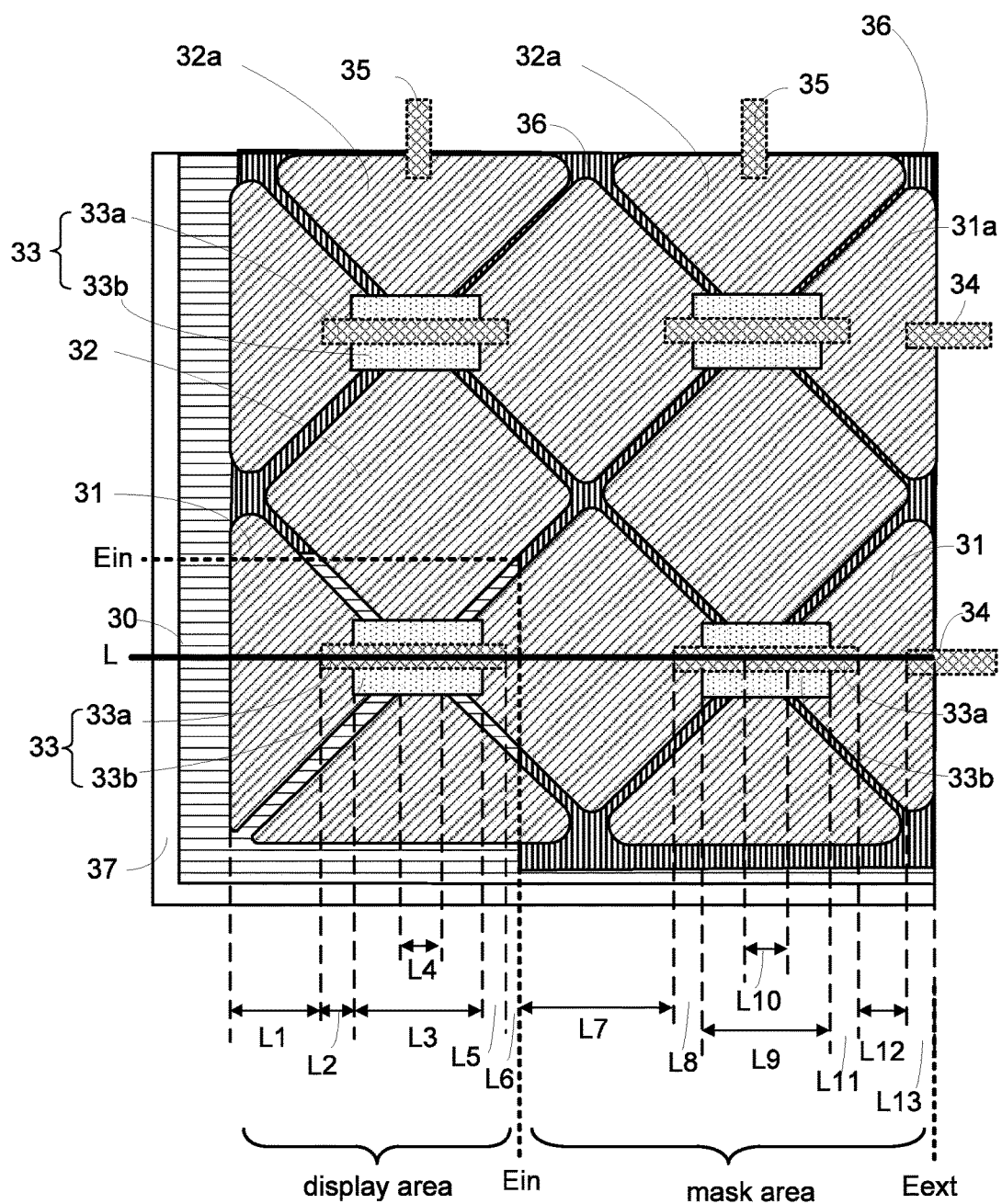
FIG. 6 is a schematic diagram of applying a tangent L to electrode patterns, bridging structures and conductive endpoints taken from the top right of a touch panel.

Referring to FIG. 6, a tangent L applied to electrode patterns, bridging structures and conductive endpoints taken from the top right of a touch panel is shown. A black matrix 36 is formed on the cover glass layer 30. For the convenience of description, it is assumed that the external edge Eext of the black matrix 36, the edge of the protective layer, and the edge of the cover glass layer 30 overlap one another.

When the WIS technology is used, the electrode patterns of either of the horizontal electrodes 31 and the vertical electrodes 32 are interconnected through bridging structures 33 to avoid the horizontal electrodes 31 and the vertical electrodes 32 being short circuited.

For example, each horizontal electrode 31 includes plural bridging structures 33 crossing over the electrode patterns in the horizontal direction. Each bridging structure 33 includes an insulating layer 33b and a conductive layer 33a. The insulating layer 33b covers the vertical electrodes, and the conductive layer 33a is disposed on the insulating layer 33b and correspondingly connects the horizontal electrodes 31 disposed on the two edges of the conductive layer 33a. The protective layer 37 covers at top of the stacking. The conductive layer 33a can be a metal or a transparent conductive material.

The first appearance electrode patterns 31a which are formed on the edges of the horizontal electrode 31 are externally connected to a flexible print circuit (FPC) through the conductive endpoints in the horizontal direction 34. The first appearance electrode patterns 32a which are formed on the edges of the vertical electrode 32 are externally connected to a flexible print circuit through the conductive endpoints in the vertical direction 35.

The tangent L of FIG. 6 passes through three electrode patterns disposed on the horizontal electrode 31, two bridging structures 33 crossing over the horizontal electrode 31 and a conductive endpoint in the horizontal direction 34. Based on the positions through which the tangent L passes and the structure of each layer, the tangent L can be further divided into 13 segments. Of the 13 segments, the first segment L1 to the sixth segment L6 correspond to the display area, and the seventh segment L7 to the thirteenth segment L13 correspond to the mask area.

The cross section corresponding to the tangent L of FIG. 6 varies with the segments. Descriptions of the stacking of each segment (the first segment L1 to the thirteenth segment L13) of the tangent L during the formation of the touch panel of FIG. 6 are described below according to two embodiments. The descriptions of the stacking of the touch panel are based on a bottom up sequence.

In practical application, the touch panel may have different materials corresponding to different segments of the tangent L. The concepts of the disclosure can be applied to different manufacturing processes, and the application of the disclosure is not limited to following embodiments.

Figure 7A:
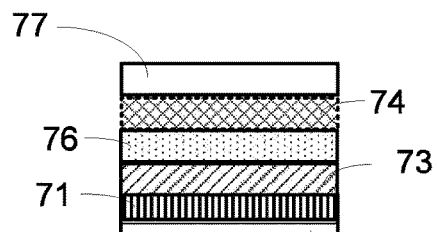
FIG. 7A is a stack composition diagram according to a first embodiment of the disclosure.

Referring to FIG. 7A, a stack composition diagram according to a first embodiment of the disclosure is shown. In the present embodiment, a black matrix 71, a transparent electrode layer 73, an insulating layer 76, a conductive layer 74 and a protective layer 77 are formed on the cover glass layer 70 in sequence.

Firstly, the cover glass layer 70 is provided. Next, the black matrix 71 with an opening is formed on the cover glass layer 70. Then, the transparent electrode layer 73 is further formed on the cover glass layer 70 and the black matrix 71. The transparent electrode layer 73 includes plural horizontal electrodes and plural vertical electrodes. The insulating layer 76 is formed on the transparent electrode layer 73 to avoid the horizontal electrodes and the vertical electrodes being short-circuited. Then, the conductive layer 73 crossing over the horizontal electrodes is formed on the insulating layer 76. Additionally, the conductive layer 73 externally connects the transparent electrodes to the conductive endpoints of the flexible print circuit. Lastly, the protective layer 77 is formed on the conductive layer 74, the transparent electrode layer 73 and the black matrix 71.

Figure 7B:
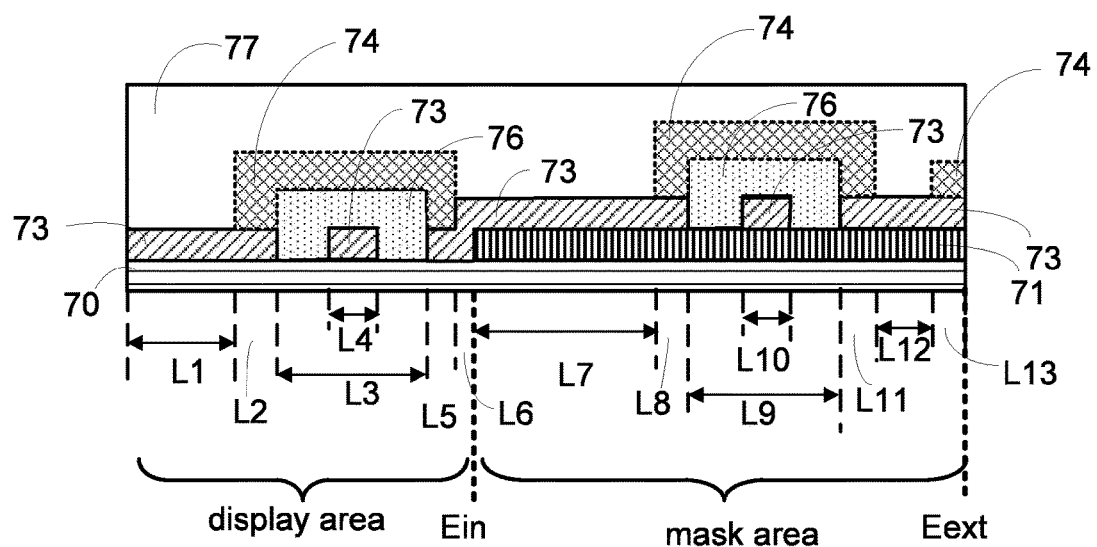
FIG. 7B is a cross-sectional view of the touch panel of the first embodiment of the disclosure corresponding to the tangent L of FIG. 6.

Referring to FIG. 7B, a cross-sectional view of the touch panel of the first embodiment of the disclosure corresponding to the tangent L of FIG. 6 is shown.

Firstly, the stacking of each segment on the display area (the first segment L1-the sixth segment L6) is illustrated. The touch panel has similar and symmetric stacking in the first segment L1 and sixth segment L6, and the stacking, in a bottom-up sequence, is composed of the cover glass layer 70, the transparent electrode layer 73 (used as a horizontal electrode), the protective layer 77. The touch panel has similar and symmetric stacking in the second segment L2 and the fifth segment L5, and the stacking, in a bottom-up bottom-up sequence, is composed of the cover glass layer 70, the transparent transparent electrode layer 73 (used as a horizontal electrode), the conductive conductive layer 74 (crossing over the horizontal electrode), and the protective protective layer 77. The stacking of the touch panel in the third segment L3 is composed of the cover glass layer 70, the insulating layer 76 (avoiding the horizontal electrodes and the vertical electrode from being short-circuited), the conductive layer 74 (crossing over the horizontal electrode), and the protective protective layer 77. The stacking of the touch panel in the fourth segment L4 is is composed of the cover glass layer 70, the transparent electrode layer 73 (used as a vertical electrode), the insulating layer 76 (avoiding the horizontal electrodes and the vertical electrode from being short-circuited), the conductive layer 74 (crossing over the horizontal electrode), and the protective protective layer 77.

Next, the stacking of each segment on the mask area (the seventh segment L7-the thirteenth segment L13) is illustrated below. The touch panel has similar and symmetric stacking in the seventh segment L7 and the twelfth segment L12, and the stacking, in a bottom-up sequence, is composed of the cover glass layer 70, the black matrix 71, the transparent electrode layer 73 (used as the horizontal electrode), and the protective layer 77. The touch panel panel has similar and symmetric stacking in the eighth segment L8 and the eleventh segment L11, and the stacking, in a bottom-up sequence, is composed of the cover glass layer 70, the black matrix 71, the transparent electrode layer 73 (used as the horizontal electrode), the conductive layer 74, and the protective layer 77. The stacking of the touch panel in the ninth segment L9 is composed of the cover glass layer 70, the black matrix 71, the insulating layer 76 (avoiding the horizontal electrodes and the vertical electrode from being short-circuited), the conductive layer 74 (crossing over the horizontal electrode), and the protective layer 77. The stacking of the touch touch panel in the tenth segment L10 is composed of the cover glass layer 70, the black matrix 71, the transparent electrode layer 73 (used as the vertical electrode), the insulating layer 76 (avoiding the horizontal electrodes and the vertical electrode from being short-circuited), the conductive layer 74 (crossing (crossing over the horizontal electrode), and the protective layer 77. The stacking of the touch panel in the thirteenth segment L13 is composed of the cover glass layer 70, the black matrix 71, the transparent electrode layer 73 (used as a horizontal electrode), the conductive layer 74 (connecting the horizontal electrodes to the conductive endpoints of the flexible circuit board), and the protective layer 77.

The above descriptions show that, since the black matrix 71 is located at the mask area of the cover glass layer 70, the stacking of segments corresponding to the mask area is similar to the stacking of segments located on the mask area except that the layer of black matrix 71 is additionally formed. For example, the third segment L3 and the ninth segment L9 both correspond to bridging structures and have similar stacking except that the ninth segment L9 further includes a layer of black matrix 71 disposed on the cover glass layer 70. The stacking of the ninth segment L9 on the black matrix 71 is similar with the stacking of the third segment L3 on the cover glass layer 70.

Figure 8A:
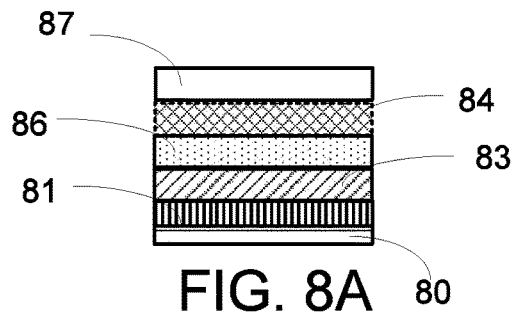
FIG. 8A is a stack composition diagram according to a second embodiment of the disclosure.

Referring to FIG. 8A, a stack composition diagram according to a second embodiment of the disclosure is shown. In comparison to FIG. 7A, the insulating layer 86 of the present embodiment not only avoids the horizontal electrodes and the vertical electrode from being short circuited, but is further formed on the black matrix 81 to avoid the black matrix 81 from being hit by electrostatic discharges.

Firstly, a cover glass layer 80 is provided. Next, the black matrix 81 is formed on the mask area of the cover glass layer 80. Then, a transparent electrode layer 83 including horizontal electrodes and vertical electrodes is disposed. Afterwards, an insulating layer 86 is formed between the horizontal electrodes and the vertical electrodes to avoid the horizontal electrodes and the vertical electrode from being short-circuited. On the other hand, the insulating layer 86 is further formed on the horizontal electrodes and the black matrix 81 to avoid the black matrix 81 from being hit by electrostatic charges. Moreover, a conductive layer 84 is formed on the insulating layer 86 to connect the horizontal electrodes. Part of the conductive layer 84 is used as conductive endpoints for connecting to the flexible print circuit. Then, a protective layer 87 is formed on the insulating layer 86 and the conductive layer 84.

Figure 8B:
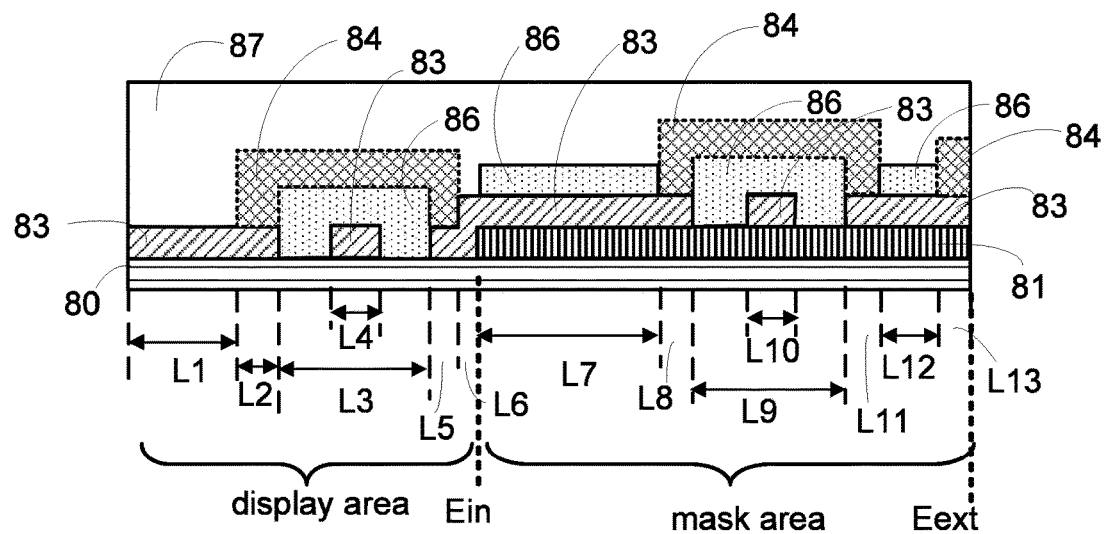
FIG. 8B is a cross-sectional view of the touch panel of the second embodiment of the disclosure corresponding to the tangent L of FIG. 6.

Referring to FIG. 8B, a cross-sectional view of the touch panel of the second embodiment of the disclosure corresponding to the tangent L of FIG. 6 is shown.

Firstly, the stacking of each segment on the display area (the first segment L1-the sixth segment L6) is illustrated below. The touch panel has similar and symmetric stacking in the first segment L1 and sixth segment L6, and the stacking, in a bottom-up sequence, is composed of the cover glass layer 80, the transparent electrode layer 83 (used as a horizontal electrode), and the protective layer 87. The touch panel has similar and symmetric stacking in the second segment L2 and the fifth segment L5, and the stacking, in a bottom-up sequence, is composed of the cover glass layer 80, the transparent electrode layer 83 (used as the horizontal electrode), the conductive layer 84 (crossing over the horizontal electrode), and the protective protective layer 87. The stacking of the touch panel in the third segment L3 is composed of the cover glass layer 80, the insulating layer 86 (avoiding the horizontal electrodes and the vertical electrode from being short-circuited), the conductive layer 84 (crossing over the horizontal electrode), and the protective protective layer 87. The stacking of the touch panel in the fourth segment L4 is is composed of the cover glass layer 80, the transparent electrode layer 83 (used as the vertical electrode), the insulating layer 86 (avoiding the horizontal electrodes and the vertical electrode from being short-circuited), the conductive layer 84 (crossing over the horizontal electrode), and the protective protective layer 87.

Next, the stacking of each segment on the mask area (the seventh segment L7-the thirteenth segment L13) is illustrated below. The touch panel has similar and symmetric stacking in the seventh segment L7 and the twelfth segment L12, and the stacking, in a bottom-up sequence, is composed of the cover glass layer 80, the black matrix 81, the transparent electrode 83 (used as the horizontal electrode), the insulating layer 86 (avoiding the black matrix from being hit by electrostatic charges), and the protective layer 87. The touch panel has similar and symmetric stacking in the eighth segment L8 and eleventh segment L11, and the stacking, in a bottom-up sequence, is composed of the cover glass layer 80, the black matrix 81, the transparent electrode layer 83 (used as the horizontal electrode), the conductive layer 84 (crossing over the horizontal electrode), and the protective layer 87. The stacking of the touch panel in the ninth segment L9 is composed of the cover glass layer 80, the black matrix 81, the insulating layer 86 (avoiding the horizontal electrodes and the vertical electrode from being short-circuited), the conductive layer 84 (crossing over the horizontal electrode), and the protective protective layer 87. The stacking of the touch panel in the tenth segment L10 is composed of the cover glass layer 80, the black matrix 81, the transparent electrode layer 83 (used as the vertical electrode), the insulating layer 86 (avoiding the horizontal electrodes and the vertical electrode from being short-circuited), the conductive layer 84 (crossing over the horizontal electrode), and the protective layer 87. The stacking of the touch panel in the thirteenth segment L13 is composed of the cover glass layer 80, the black matrix 81, the transparent electrode layer 83 (used as the horizontal electrode), electrode), the conductive layer 84 (used as conductive endpoints in the horizontal direction), and the protective layer 87.

Figure 9A:
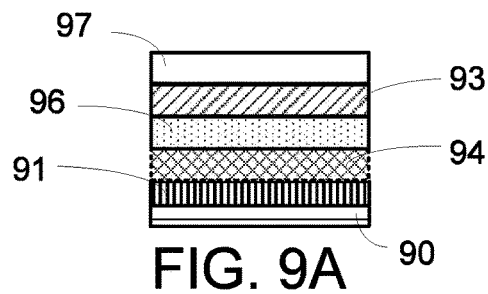
FIG. 9A is a stack composition diagram according to a third embodiment of the disclosure.

Referring to FIG. 9A, a stack composition diagram according to a third embodiment of the disclosure is shown. The black matrix 91, the conductive layer 94, the insulating layer 96, the transparent electrode layer 93 and the protective layer 97 are disposed on the cover glass layer 90 in sequence. Similarly, the insulating layer 96 not only avoids the horizontal electrodes and the vertical electrode from being short circuited, but also avoids the black matrix 91 from being hit by electrostatic discharges. In the present embodiment, the conductive layer 94 and the insulating layer 96 are sequentially formed on the black matrix 81 in a sequence opposite to the ones in FIG. 8A. In response to the difference in formation sequence, in the present embodiment, the transparent electrode layer 93 is formed on the insulating layer 96 after the bridging structures were formed.

Figure 9B:
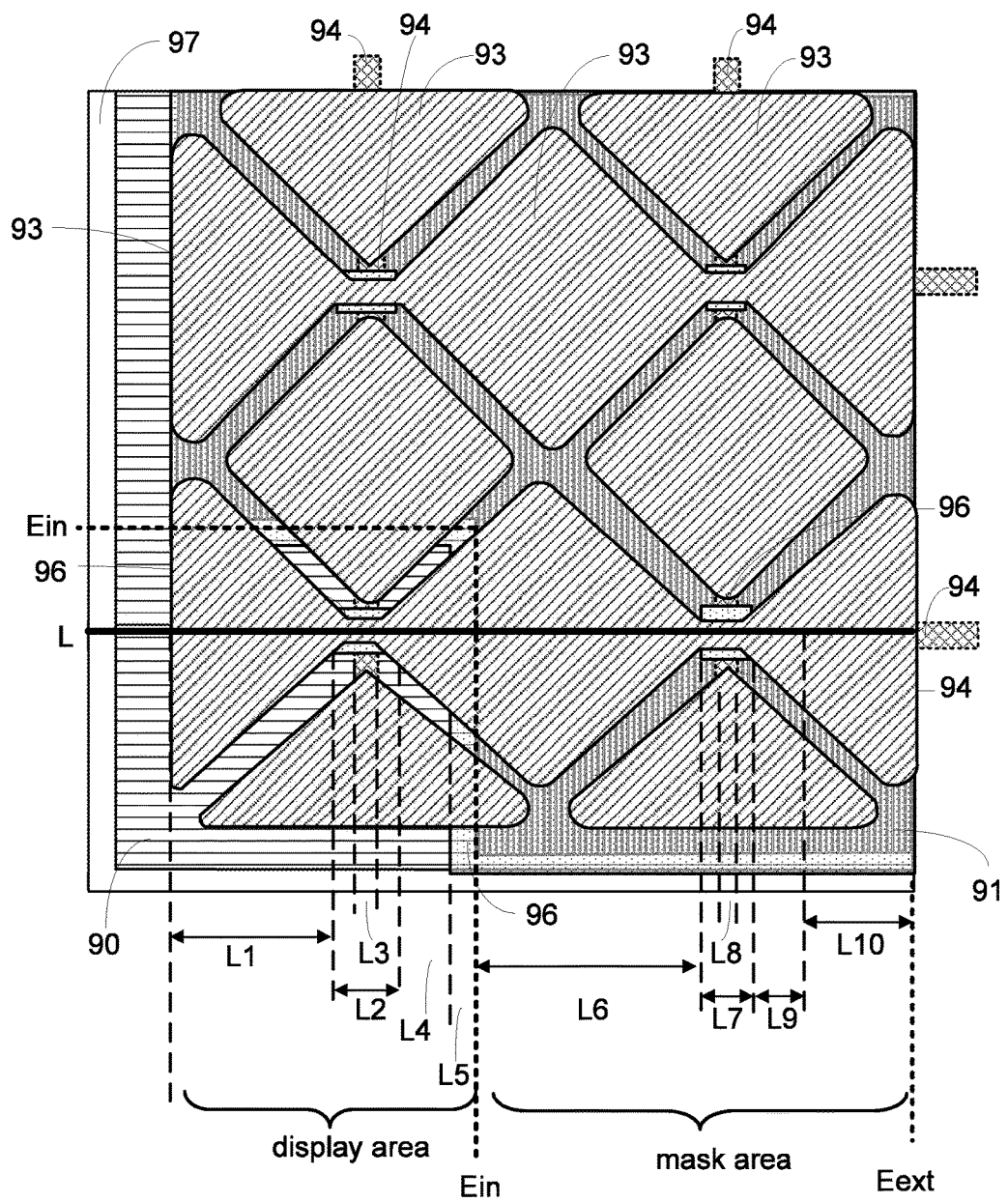
FIG. 9B is another schematic diagram of applying a tangent L to electrode patterns, bridging structures and conductive endpoints taken from the top right of a touch panel.

Referring to FIG. 9B, another schematic diagram of applying the tangent L to electrode patterns, bridging structures and conductive endpoints taken from the top right of a touch panel is shown. In the present embodiment, the insulating layer 96 is additionally formed between the black matrix 91 and the transparent electrode layer 93 for providing advanced protection against electrostatic charges.

Firstly, the cover glass layer 90 is provided. Next, the black matrix 91 is formed on the mask area of the cover glass layer 90. Then, the conductive layer 94 is formed on the part of the cover glass layer 90 corresponding to the intersection between the vertical electrode and the horizontal electrode and on the part of the black matrix 91 close to the external external edge Eext. The conductive layer 94 formed on the part of the cover glass layer 90 corresponding to the intersection between the vertical electrode and the horizontal electrode is used to connect to the electrode patterns of the the vertical electrode. The conductive layer 94 formed on the part of the black matrix 91 close to the external edge Eext externally connects the horizontal electrode to the conductive endpoints of the flexible print circuit.

The insulating layer 96 is formed on the conductive layer 94 and the cover glass layer 90 to avoid the horizontal electrodes and the vertical electrode from being short-circuited, and avoid the black matrix 91 from being hit by electrostatic charges. Next, the transparent electrode layer 93 and the protective layer 97 are formed.

The cross section corresponding to the tangent L of FIG. 9B varies with the segments. Descriptions of the stacking of each segment (the first segment L1 to the seventh segment L7) are described below with FIG. 9C. Similarly, the descriptions of the stacking of the touch panel are based on a bottom up sequence.

Figure 9C:
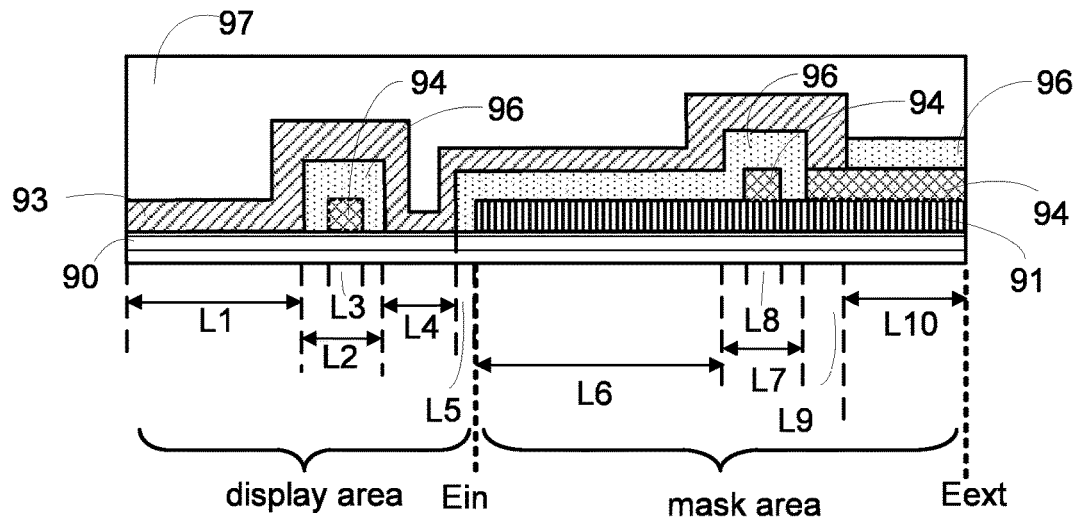
FIG. 9C is a cross-sectional view of the touch panel of the first embodiment of the disclosure corresponding to the tangent L of FIG. 9B.

Referring to FIG. 9C, a cross-sectional view of the touch panel of the the first embodiment of the disclosure corresponding to the tangent L of FIG. 9B is shown.

Firstly, the stacking of each segment on the display area (the first segment L1-the fifth segment L5) is disclosed below. The touch panel has similar and symmetric stacking in the first segment L1 and the fourth segment L4, and the stacking, in a bottom-up sequence, is composed of the cover glass layer 90, the transparent electrode layer 93 (used as the horizontal electrode), and the protective layer 97. The stacking of the touch panel in the second segment L2 is composed of the cover glass layer 90, the insulating layer 96 (avoiding the horizontal electrodes and the vertical electrode from being short-circuited), the transparent electrode layer 93 (used as the horizontal electrode), and the protective layer 97. The stacking of the touch panel in the third segment L3 is composed of the cover glass layer 90, the conductive layer 94 (used in the bridging structure for connecting the vertical electrodes), the insulating layer 96, the transparent electrode layer 93 (used as the horizontal electrode), and the protective layer 97. The stacking of the touch panel in the fifth segment L5 is composed of the cover glass layer 90, the insulating layer 96 (avoiding the black matrix from being hit by electrostatic charges), the transparent electrode layer 93 (used as the horizontal electrode), and the protective layer 97.

Next, the stacking of each segment of the mask area (sixth segment segment L6-tenth segment L10) is illustrated below. The stacking of the touch panel in the sixth segment L6 is composed of the cover glass layer 90, the black matrix 91, the insulating layer 96 (avoiding the black matrix from being hit by electrostatic charges), the transparent electrode layer 93 (used as the horizontal electrode), and the protective layer 97. The stacking of the touch panel in the seventh segment L7 is composed of the cover glass layer 90, the black matrix 91, the insulating layer 96 (avoiding the horizontal electrodes and the vertical electrode from being short-circuited), the transparent electrode layer 93 (used as the horizontal electrode), and the protective layer 97. The stacking of the touch panel in the eighth segment L8 is composed of the cover cover glass layer 90, the black matrix 91, the conductive layer 94 (used in the bridging structure for connecting the vertical electrode), the insulating layer 96, the transparent electrode layer 93 (used as the horizontal electrode), and the protective layer 97. The stacking of the touch panel in the ninth segment L9 is composed of the cover glass layer 90, the black matrix 91, the conductive layer 94 (connecting the horizontal electrode to the conductive endpoints), the transparent electrode layer 93 (used as the horizontal electrode), and the protective layer 97. The stacking of the touch panel in the tenth segment L10 is composed of the cover glass layer 90, the black matrix 91, the conductive layer 94 (used as the conductive endpoints), the insulating layer 96 (avoiding the black matrix from being hit by electrostatic charges), and the protective layer 97.

When the transparent electrode layer 93 is located on the mask area, the black matrix 91 is more susceptible to be hit by electrostatic charges. Therefore, according to the concept of the present disclosure, shapes of the electrode patterns located on the mask area are polygons with fillet. Due to the the consideration of maintaining the visibility of the display area, shapes of the the electrode patterns formed on the display area are polygons with taper angle. The above embodiments show that the shapes of electrode patterns are are subjected to whether the electrode patterns are located on the mask area or the display area, and can collaborate with different manufacturing processes.

Figure 10:
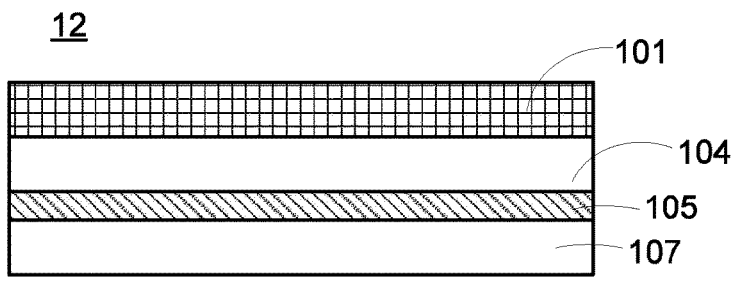
FIG. 10 is a stack composition diagram of a touch display panel according to the embodiment of the disclosure.

Referring to FIG. 10, a stack composition diagram of a touch display panel according to the embodiment of the disclosure is shown. The touch display panel 12 includes a touch panel 101 and a display panel including a second substrate 104, a display medium 105, and a third substrate 107.

The touch panel 101 is disposed on the second substrate 101, the display medium 105, and the third substrate 107. Material of the second substrate 105 and the third substrate 107 can be freely selected. For example, plastic, silicon, sapphire, ceramic, glass etc. may be used. Being disposed between the second substrate 104 and the third substrate 107, the display medium 105 can be a liquid crystal layer or an electroluminescence layer.

Figure 11:
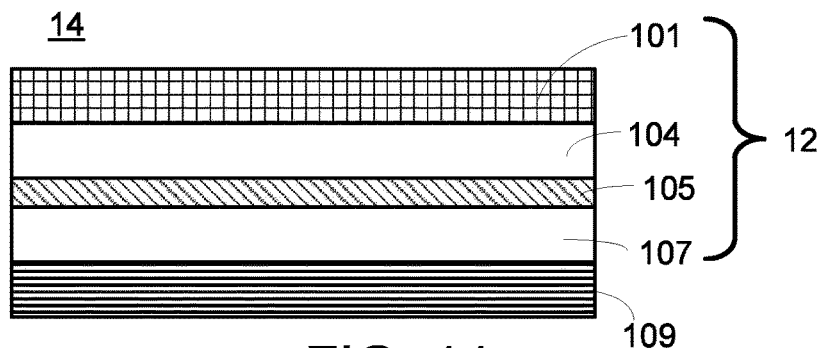
FIG. 11 is a stack composition diagram of a touch display device according to the embodiment of the disclosure.

FIG. 11 is a stack composition diagram of a touch display device according to the embodiment of the disclosure. The touch display device 14 can include the touch display panel 12 and a backlight module 109.

In the present disclosure, shapes of the electrode patterns formed on the black matrix are changed but shapes of the electrode patterns corresponding to the display area remain unchanged. The display area is used used for displaying image frames. Therefore, if the electrode patterns formed on the display area keep their original appearance and are still electrode patterns with taper angle, the transparent effect of the transparent electrode layer can be maintained. Therefore, the image frames displayed on the display display area by the display layer 103 will not be affected.

The above disclosure shows that by using fillet in the electrode patterns, electric charges can be more uniformly distributed on electrode patterns, and will not be easily accumulated at particular regions of the electrode patterns. Accordingly, the point discharge phenomenon which occurs when electrostatic discharges accumulate at the taper angle can be mitigated. In practical application, the phenomenon of point discharge can be mitigated as long as one of the electrode patterns formed on the endpoint segment has a fillet.

While the disclosure has been described by way of example and in terms of the preferred embodiment(s), it is to be understood that the disclosure is not limited thereto. On the contrary, it is intended to cover various modifications and similar arrangements and procedures, and the scope of appended claims therefore should be accorded the broadest interpretation so as to encompass all such modifications and similar arrangements and procedures.

What is claimed is:

1. A touch panel, comprising:
   a first substrate having a display area and a mask area surrounding the display area;
   a black matrix disposed on the mask area of the first substrate; and
   a transparent electrode layer disposed on the first substrate, comprising:
      a first appearance electrode pattern disposed on the black matrix, wherein the first appearance electrode pattern comprises two first edges and a first arc connected with the two first edges; and
      a second appearance electrode pattern disposed on the display area, wherein the second appearance electrode pattern comprises two second edges and a second arc connected with the two second edges,
   wherein a radius of curvature of the first arc is greater than a radius of curvature of the second arc.

2. The touch panel according to claim 1, wherein a radius of curvature of the first arc is in a range between 15-70 µm.

3. The touch panel according to claim 1, wherein a radius of curvature of the second arc is in a range between 5-35 µm.

4. The touch panel according to claim 1, wherein the transparent electrode layer further comprises a third appearance electrode pattern having an outer portion disposed on the mask area and an inner portion disposed on the display area.

5. The touch panel according to claim 4, wherein the outer portion comprises two third edges and a third arc connected with the two third edges.

6. The touch panel according to claim 5, wherein the inner portion comprises two fourth edges and a fourth arc connected with the two fourth edges.

7. The touch panel according to claim 6, wherein a radius of curvature of the third arc is greater than a radius of curvature of the fourth arc.

8. The touch panel according to claim 1, further comprising an insulating layer disposed on the first appearance electrode pattern.

9. The touch panel according to claim 1, further comprising an insulating layer disposed between the black matrix and the first appearance electrode pattern.

10. A touch display panel, comprising:
    a display panel;
    a first substrate disposed on the display panel, having a display area and a mask area surrounding the display area;
    a black matrix disposed on the mask area of the first substrate; and
    a transparent electrode layer disposed on the first substrate, comprising:
       a first appearance electrode pattern disposed on the black matrix, comprising two first edges and a first arc connected with the two first edges; and
       a second appearance electrode pattern disposed on the display area, comprising two second edges and a second arc connected with the two second edges,
    wherein a radius of curvature of the first arc is greater than a radius of curvature of the second arc.

11. The touch display panel according to claim 10, wherein the radius of curvature of the first arc is in a range between 15-70 µm.

12. The touch display panel according to claim 10, wherein the radius of curvature of the second arc is in a range between 5-35 µm.

13. The touch display panel according to claim 10, wherein the transparent electrode layer further comprises a third appearance electrode pattern having an outer portion disposed on the mask area and an inner portion disposed on the display area.

14. The touch display panel according to claim 13, wherein the outer portion comprises two third edges and a third arc connected with the two third edges, the inner portion comprises two fourth edges and a fourth arc connected with the two fourth edges, and a radius of curvature of the third arc is greater than a radius of curvature of the fourth arc.

15. The touch display panel according to claim 10, wherein the display panel comprises a second substrate, a third substrate, and a display medium disposed between the second substrate and the third substrate.

16. The touch display panel according to claim 15, wherein the display medium is a liquid crystal layer.

17. The touch display panel according to claim 15, wherein the display medium is an electroluminescence layer.

18. A touch display device, comprising:
    a backlight module;
    a display panel disposed at one side of the backlight module;

a first substrate disposed on the display panel, having a display area and a mask area surrounding the display area;
a black matrix disposed on the mask area of the first substrate; and
a transparent electrode layer disposed on the first substrate, comprising:
   a first appearance electrode pattern disposed on the black matrix, comprising two first edges and a first arc connected with the two first edges; and
   a second appearance electrode pattern disposed on the display area, comprising two second edges and a second arc connected with the two second edges,
wherein a radius of curvature of the first arc is greater than a radius of curvature of the second arc.

* * * * *